June 21, 1960 R. E. LYMAN 2,942,044
ELECTRIC ARC FURNACE
Filed Feb. 27, 1958 5 Sheets-Sheet 1

Inventor:
Richard E. Lyman
by M. W. Goodwin
His Attorney

June 21, 1960
R. E. LYMAN
2,942,044
ELECTRIC ARC FURNACE
Filed Feb. 27, 1958
5 Sheets-Sheet 2
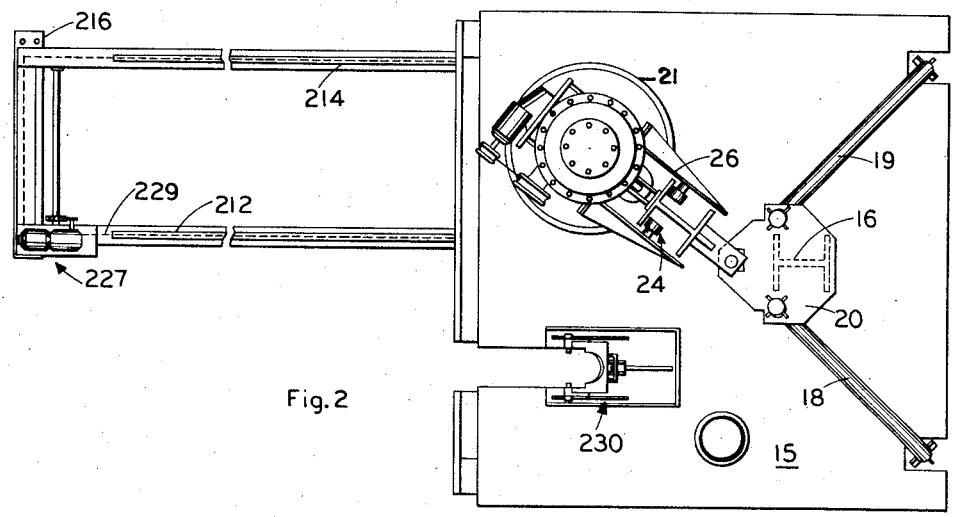
Fig. 2
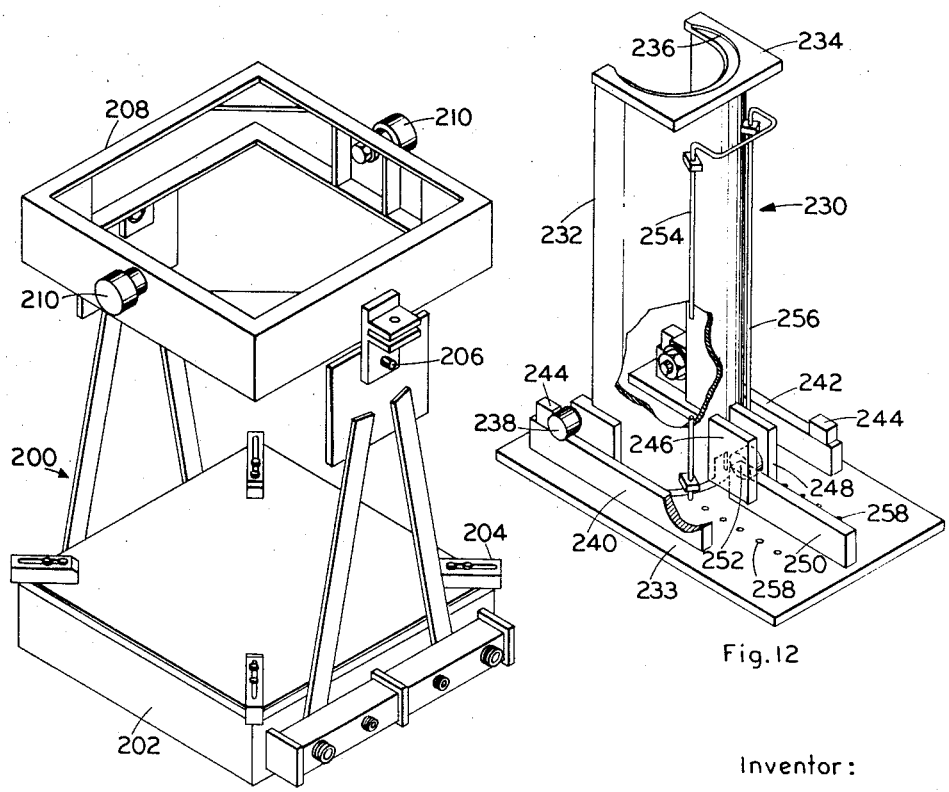
Fig. 10
Fig. 12
Inventor:
Richard E. Lyman
by M. W. Goodwin
His Attorney June 21, 1960 R. E. LYMAN 2,942,044
ELECTRIC ARC FURNACE
Filed Feb. 27, 1958 5 Sheets-Sheet 3

Inventor:
Richard E. Lyman
by M&W Goodwin
His Attorney

Inventor:
Richard E. Lyman
by M W Goodwin
His Attorney

Inventor:
Richard E. Lyman
by M W Goodwin
His Attorney

United States Patent Office 2,942,044
Patented June 21, 1960

2,942,044

ELECTRIC ARC FURNACE

Richard E. Lyman, Homewood, Ill., assignor to General Electric Company, a corporation of New York Filed Feb. 27, 1958, Ser. No. 718,071

25 Claims. (Cl. 13—9)

This invention relates to electric arc furnaces and more particularly to novel improvements in a consumable electrode type vacuum arc furnace wherein metal is melted within a hermetically sealed enclosure which may be evacuated and wherein the heat for the melt is provided by an electric arc between a consumable electrode, fabricated of the material to be melted, and a pool of molted metal formed by melting of the electrode.

The hermetically sealed enclosure of an exemplary consumable electrode vacuum arc furnace comprises an elongated vertically arranged electrode housing mounted for limited vertical movement and a demountable crucible aligned with and disposed beneath the electrode housing. The electrode is received within the enclosure in alignment therewith and extending into the crucible, and an external power source is connected to the electrode and crucible. Inasmuch as during operation of the furnace, the electrode is consumed, suitable means must be provided to feed the electrode, as it is consumed, in order to sustain the arc. To provide for feeding of the electrode, the electrode is, in many of such furnaces, suspended in the housing by an elongated support or stinger extending upwardly through and beyond the upper end of the housing for connection to a suitable drive for movement thereof.

The preferred operational criteria for such furnaces result in certain problems in furnace construction and operation which it is desirable to minimize or to eliminate. For example, it is preferred that the electrode be of a length at least sufficient to obviate the necessity of utilizing more than one electrode to fill a crucible. Inasmuch as a stinger supporting the electrode will of necessity have a maximum projection beyond the electrode housing at least equal to the electrode travel, the overall height of the furnace will normally require head room sometimes not readily available. Further, the loading of long electrodes into a vertically extending enclosure surrounded by associated structure presents obvious difficulties in electrode handling, particularly as the electrode may in some instances be relatively fragile.

The location of the electrode in a sealed enclosure also complicates the provision of water cooling of the electrode support as well as complicating the necessary power connections to the electrode. The desired sealing of the housing further necessitates a usually complex and expensive seal between the stinger and housing which will permit relative movement of the stinger while maintaining a tight seal therebetween.

Another problem arising in the construction of such a furnace is the prevention of contamination of the molten metal in the crucible by volatile materials resulting from the consumption of the electrode, which volatiles may condense in the upper portion of the furnace and fall back into the crucible. These condensible volatiles also provide a problem of contamination of the vacuum pumping system associated with the furnace, and it is often necessary to provide a separate cold trap between the furnace and vacuum pumping system to condense out these volatiles.

Lastly, the handling of the heavy crucible, aligning it with the furnace, securing it in sealed relation with the furnace, and connecting and disconnecting the power source when changing crucibles are operations which appreciably increase the time required to set up the furnace.

It is therefore a primary and overall object of my invention to provide a consumable electrode type vacuum arc furnace of novel and improved construction whereby the manufacture, installation, and operation of the furnace will be simplified and facilitated.

It is a more specific object of my invention to provide a novel and improved electrode housing for an arc furnace of the type described which will result in elimination of any water-cooled electrode extension passing through a sliding seal at the top of the electrode housing, thus reducing the overall height of the furnace by a substantial amount, which will eliminate the necessity for long flexible water-cooled power connections to the electrode, and which will simplify the water-cooling provisions for the electrode support within the housing.

It is another object of my invention to provide, in a furnace of the type described, novel and improved provisions for mounting the electrode housing whereby the loading of an electrode into the housing will be simplified and facilitated with an attendant reduction in time required to change electrodes.

It is another object of my invention to provide, in a furnace of the type described, novel improvements in the furnace body for preventing the volatiles resulting from consumption of the electrode from contaminating the metal in the crucible as well as certain portions of the furnace body, and also for preventing these volatiles from reaching a vacuum system associated with the furnace.

It is yet another object of this invention to provide, in a furnace of the type described, novel and improved means for connecting the electrode and crucible to an external power source which will provide self-connection and disconnection of the power source and the electrode and crucible in response to seating and unseating of these components.

It is a further object of my invention to provide, in a furnace of the type described, novel and improved means for handling the crucible during changes thereof and for supporting the crucible in sealed engagement with the furnace whereby the problem of crucible alignment is eliminated and whereby the time required to change crucibles is materially reduced.

In carrying out my invention, I provide a consumable electrode-type vacuum arc furnace in which the furnace body comprises a fixed base portion and an electrode housing extending upwardly therefrom. The electrode housing comprises a pair of elongated concentric hollow member, or more specifically, cylinders, arranged one within the other with the electrode suspended within the inner cylinder for movement longitudinally thereof by an electrode support wholly received in the inner cylinder and slidably engaged with the inner wall of the inner cylinder. The pair of cylinders are radially spaced apart to provide a passage for circulation of cooling water therebetween, and the current connection to the electrode is provided by the sliding engagement of the electrode support assembly with the inner cylinder which is adapted to be connected to an external source of power. This construction eliminates the need for a water-cooled electrode extension passing through a sliding seal at the top of the electrode housing and extending a substantial distance thereabove and also eliminates the use of flexible water-cooled power connections to the electrode, as well as the need for electrode support water-cooling provisions mounted for movement with the support. To further carry out my invention, the electrode housing is not only mounted for limited vertical movement but also is hingedly supported for swinging movement in a horizontal plane from its operative position in alignment with a crucible therebelow to permit loading of the electrode into the housing in a more convenient location which is remote from the operative position of the housing and where, normally, more free space is available.

When in operative position, the electrode housing seats, in sealed relation, on the fixed base portion and, in keeping with the object of facilitating power connections to the electrode, I provide a resiliently flexible electrical contactor on the fixed base which is adapted to be connected to an external source of power and which is engageable by the housing in response to seating thereof on the base to make an electrical connection in the inner cylinder of the housing and, thus, to the electrode. The resilient flexibility of the contactor assures a good electrical connection with the housing while permitting full seating of the electrode housing on the base.

The base portion is, in accordance with known practice, substantially larger in cross-sectional area than the electrode housing and also the crucible which is seated in sealed relation on the bottom of the base in alignment with the electrode housing. The relatively large size of the base provides a receptacle for a certain amount of the condensable volatiles resulting from the furnace operation so as to prevent re-entry of the volatiles into the crucible. In accordance with my object of further reducing the deleterious effects of these volatiles, I have provided a cylindrical baffle in the lower end of the base coaxially alignable with the crucible and having an internal annular cooling fluid passageway. The baffle serves to shield the interior of the base portion from direct radiation from the arc in the crucible and also serves to condense out the condensable volatiles before they reach certain portions of the base which might be adversely affected thereby. The baffle, acting as a cold trap, also eliminates a need for a separate cold trap between the furnace body and the vacuum pumping system connected thereto. I also provide a similar internally cooled cylindrical baffle as an integral portion of the lower end of the electrode housing. This baffle or the electrode housing projects into the base portion when the electrode housing is seated thereon and prevents condensable volatiles from reaching the interior of the electrode housing where they might adversely affect the sliding electrical contact between the housing and the electrode support assembly.

The objective of facilitating the changing of crucibles and, particularly, the alignment thereof with the furnace is accomplished by supporting the crucible by a structure providing limited universal pivotal movement relative to the furnace body. The crucible is supported and raised and lowered relative to the furnace body by means of a resilient drive; and the base portion of the furnace body carries a resilient electrical contactor, similar to that discussed in connection with the electrode housing, which is engageable by the crucible in response to seating thereof on the body. Alignment problems of the crucible are obviously eliminated by the gimbal-like support of the crucible, and as will be apparent the resilient drive for raising and lowering the crucible also provides a means for compensating for thermal expansion of the crucible during furnace operations.

For a more complete understanding of my invention, together with further objects and advantages thereof, reference is made to the following description, taken in conjunction with the accompanying drawings in which:

Fig. 2 is a top view of the furnace of Fig. 1;

Fig. 10 is a perspective view of a carriage forming a portion of the supporting means for the crucible;

Fig. 12 is a perspective view of a fixture for holding the electrode in vertical position during loading thereof into the housing.

Figures 1, 3:
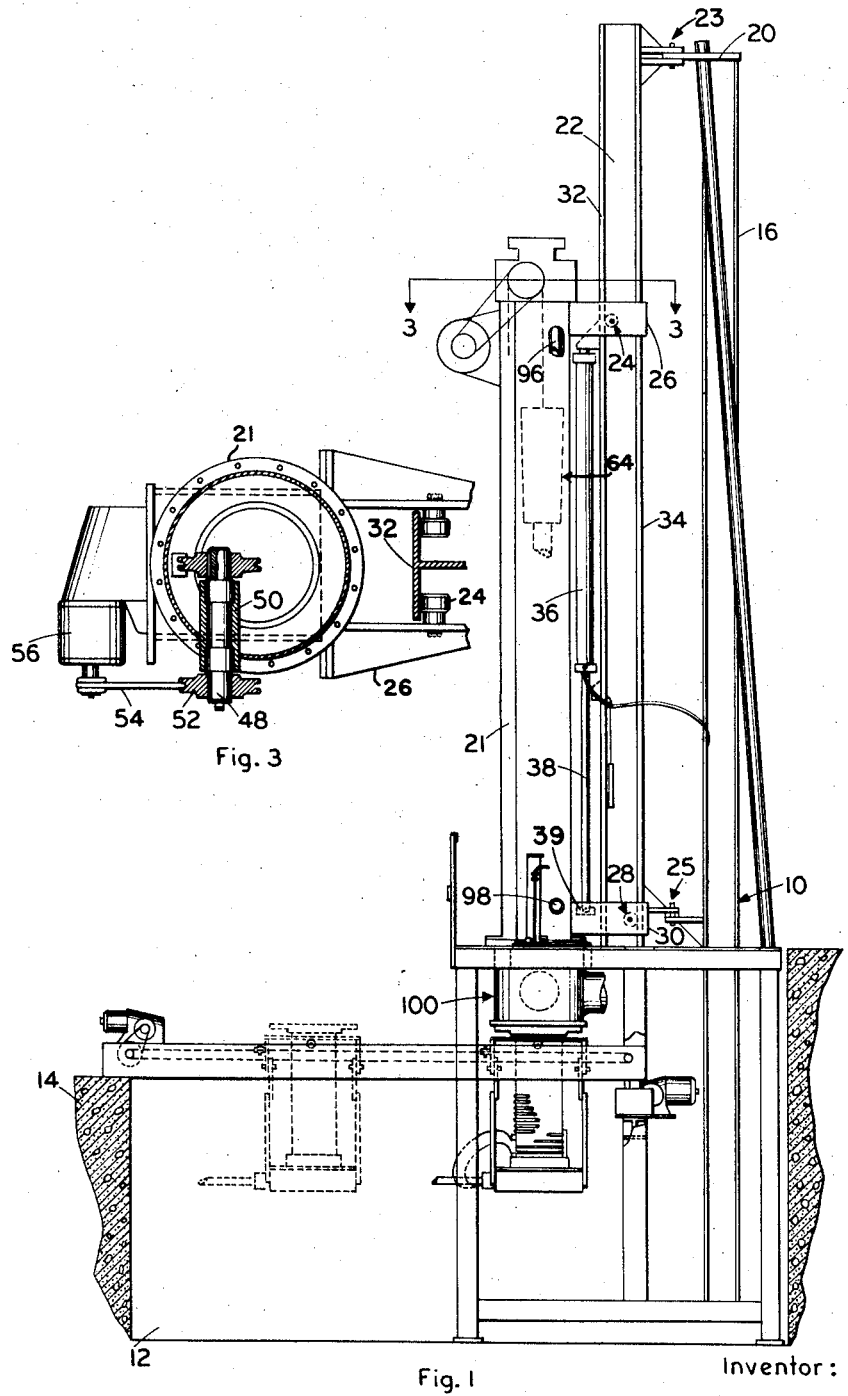
Fig. 1 is a side elevational view of a consumable electrode type vacuum arc furnace embodying my present invention.
Fig. 3 is an enlarged cross-sectional view along the lines 3—3 of Fig. 1.

With reference to the drawings, and particularly Figs. 1 to 5, a consumable electrode type vacuum-arc furnace embodying the present invention generally comprises a frame or supporting structure 10 fabricated of structural steel and adapted to be disposed in a pit 12 in the flooring 14 of the facility housing the furnace. The frame includes a platform 15 on which workmen may stand when setting up the furnace for operation. A supporting member in the form of an I-beam 16 extends upwardly from the bottom of the frame through the platform 15 and is laterally supported by a pair of booms 18, 19 mounted at their lower ends on the frame and connected at their upper ends to a plate 20 secured to the top of the I-beam 16. The electrode housing 21 is hingedly supported on the frame by means of an I-beam 22 extending parallel with the I-beam 16 and pivotally mounted top and bottom on the I-beam 16 by means of the hinged connections 23, 25 between the I-beams. The electrode housing is supported in vertical position on the I-beam 22 by means of a pair of rollers 24 carried by a bracket 26 at the top of the housing and by a pair of rollers 28 carried by a bracket 30 fixed to the bottom of the housing. The rollers 24 adjacent the top of the electrode housing are engaged with the front flange 32 of the I-beam 22 and the bottom pair of rollers 28 are engaged with the rear flange 34 of the I-beam. To provide for vertical movement of the electrode housing, a hydraulic cylinder 36 is connected at one end to the I-beam 22 and the piston rod 38 of the piston within the cylinder extends parallel to the I-beam and is pivotally connected to the electrode housing, such as at 39, adjacent the bottom thereof.

Figure 4:
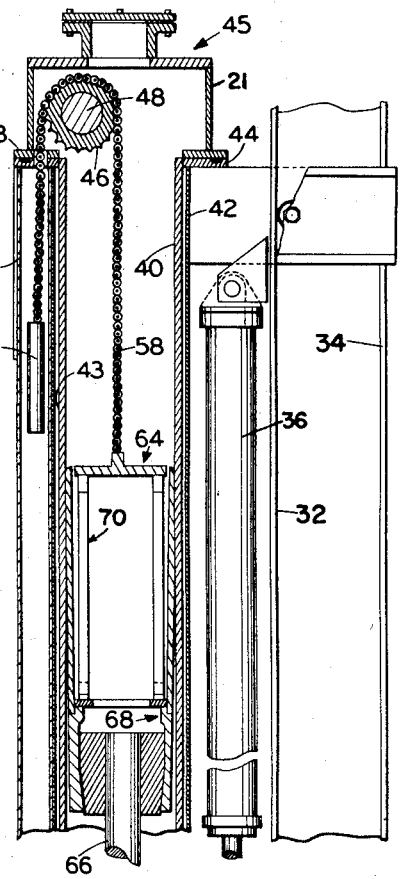
Fig. 4 is an enlarged fragmentary longitudinal cross-sectional view of the upper portion of the furnace of Fig. 1.
Figure 5:
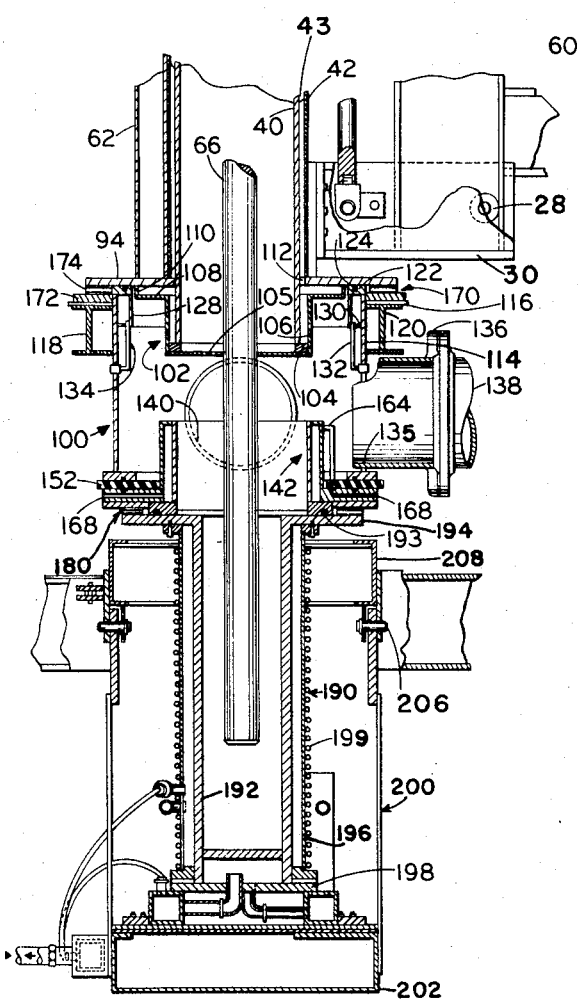
Fig. 5 is an enlarged fragmentary longitudinal cross-sectional view of the lower portion of the furnace of Fig. 1.

With particular reference to Figs. 3, 4, and 5, the electrode housing comprises a pair of elongated hollow members 40, 42 or, more specifically, metal cylinders, arranged one within the other and in radially spaced relation to provide an elongated annular space 43 between the outer wall of the inner cylinder and the inner wall of the outer cylinder. The inner cylinder is provided with a radially outwardly extending flange 44 welded thereto at its upper end, the upper end of the outer cylinder being similarly welded to the flange, thus closing the upper end of the annular space 43 between the cylinders. A closure member or cover 45 is sealingly engaged with the flange 44 to seal the upper end of the inner cylinder. With particular reference to Figs. 3 and 4, a sprocket 46 is disposed within the cover 45 and is carried by a shaft 48 extending through a seal 50 in the housing and carrying at its other end a pulley 52 connected by a belt 54 to a pulley on an electric motor 56 mounted on the front of the electrode housing. An elongated chain 58 is engaged over the sprocket and carries at one end a weight 60 disposed within an elongated sheet metal housing or channel 62 welded to the front of the electrode housing and extending longitudinally thereof. The upper end of the housing 62 for the weight is welded to the underside of the inner cylinder flange 44 to seal the upper end of the housing. The chain 58 extends through an aperture in the flange 44 and a corresponding aperture in a flange 63 of the cover 45 secured to the flange 44. The other end of the chain is connected to an electrode support assembly 64 wholly contained within the inner cylinder 40 of the electrode housing and adapted to support an electrode 66 for movement longitudinally of the electrode housing.

Figure 7:
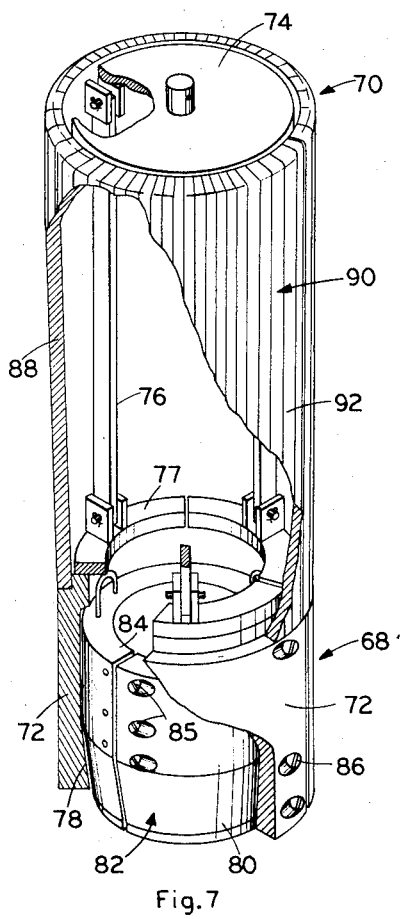
Fig. 7 is a perspective view, partly in section, of the electrode support assembly.

With particular reference to Fig. 7, the electrode support assembly comprises an electrode holder portion 68 and a current collector portion 70 extending upwardly therefrom. The electrode holder portion comprises a plurality of elongated arcuate clamping segments 72 suspended from a top plate 74 to which the chain 58, as shown in Fig. 4, attaches by means of lift bars 76 pivotally mounted at opposite ends on the top plate and on flanges 77 secured to the tops of the segments 72. These segments 72 have inclined cam or wedging surfaces 78 on the bottom inner surfaces thereof which, when the clamping segments are assembled, form a frusto-conical surface engageable with a generally complementally shaped frusto-conical surface 80 on an adapter 82. The adapter 82, which may engage the end of an electrode, comprises a plurality of elongated arcuate segments 84 each having an external taper at its lower end to form the frusto-conical surface 80. The segments of the adapter are provided with bolts or screws 85 engageable with next adjacent segments to draw the adapter into firm engagement with an electrode. The segments 72 of the holder are likewise provided with screws or bolts 86 to draw the segments into clamping engagement with the adapter. With this construction of the electrode holder, randomly sized and irregularly shaped electrodes may be securely retained, thus eliminating the need for changing electrode holders when changing the size or configuration of the electrode.

The current collector portion 70 of the electrode support assembly comprises a plurality of elongated resilient metal bars 88 welded at one end to the top of each of the clamping segments 72 and extending upwardly therefrom and inclined outwardly so that the upper ends of the bars are radially spaced outwardly from the periphery of the top plate 74 of the support assembly. With the clamping segments in assembly, as shown in Fig. 7, the bars 88 provide a generally cylindrically shaped resilient surface 90 slidably engageable with the inner surface of the inner cylinder 40 of electrode housing 21 as shown in Fig. 4; and the radially outermost surface 92 of each of the bars is preferably rounded to provide better contact with the inner cylinder. The outwardly inclined resilient cantilever mounted bars thus provide a plurality of electrical contacts resiliently and slidably engageable with the inner cylinder 40 which will provide good electrical contact and will minimize the effect of wear due to sliding contact.

Turning back to the electrode housing, as shown in Fig. 5, the inner cylinder 40 is provided with a radially outwardly extending flange 94 adjacent its lower end and spaced inwardly of the lower end of the housing. The lower ends of the outer cylinder 42 and the channel member 62 are welded to the flange 94 to seal the lower ends of the annular space between the cylinders and the channel 62. Referring again to Fig. 1, a water inlet connection 96 and a water outlet connection 98 are provided on the electrode housing, communicating with the annular space 43 in the housing, to provide for circulation of cooling water between the cylinders 40, 42 during operation of the furnace. The flange 94 at the lower end of the electrode housing is adapted to be seated in sealing engagement on the base portion 100 of the furnace body disposed below the electrode housing and fixed to the furnace supporting frame 10. The base 100 is an enlarged hollow member or cylinder which will be more particularly described hereinafter; and as apparent from Fig. 5, the lower end of the electrode housing extends coaxially into the base 100 when the flange 94 is seated on the base. The lower end of the electrode housing carries an integrally formed internally cooled tubular baffle 102 which comprises an annular ring 104 welded to the lower end of the inner cylinder 40 with the inner diameter of the ring being flush with the inner wall of the cylinder. A circular shield 105 extending across the lower open end of the inner cylinder 40 is carried by the ring 104 and is provided with a central opening through which the electrode 66 may extend. The ring 104 forms a radially outwardly extending flange on the lower end of the inner cylinder which supports a sheet metal tubular member 106 concentrically arranged over the lower end of the inner cylinder and radially spaced outwardly therefrom. The upper end of the tubular member 106 is spaced from the bottom of the flange 94 and an annular sheet metal member 108 is welded thereto and connected to the under side of the flange 94 by an upwardly directed rim or ring 110 welded to the flange 94 and periphery of the annular sheet metal member 108. To provide for the circulation of cooling fluid in the baffle 102, the space between the tubular and annular sheet metal members 106, 108 and the inner cylinder 40 and flange 94 is connected to the passageway 43 between the inner and outer cylinders of the electrode housing by openings in the flange 94 formed in the specific embodiment shown in Fig. 5 by apertures 112 along the inner edge of the flange.

Figure 6:
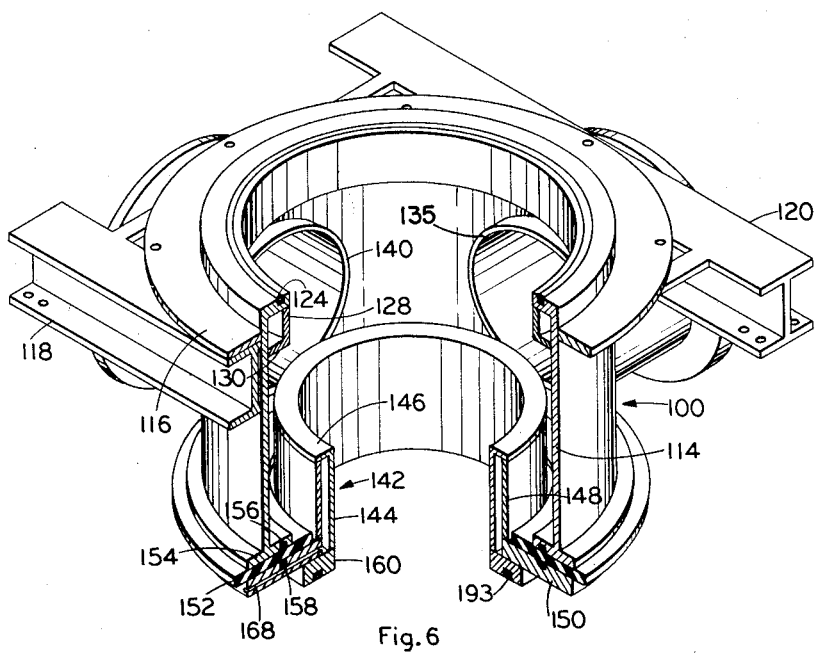
Fig. 6 is an enlarged perspective view, partly in section, of the base portion of the furnace body.

With specific reference to Figs. 5 and 6, the base 100 of the furnace body comprises a metal cylinder 114 disposed coaxially of the electrode housing and having a radially outwardly extending flange 116 adjacent but spaced inwardly of the upper end of the base, which flange is suitably secured, as by bolting, to I-beams 118, 120 extending alongside the base and forming an integral part of the furnace supporting frame 10. The base is further provided with a radially inwardly extending flange 122 at its upper end which carries a seal 124 engageable with the under side of the lower flange 94 on the electrode housing when the housing is seated on the base. It should here be noted that there are no bolts or other fastening means securing the electrode housing in seated position on the base, the weight of the electrode housing and elements movable therewith being the sole means for seating the housing on the base. In this manner, the separation of the base and housing may be accomplished with no lost time being expended for the removal of bolts and the like.

A sheet metal tubular member 128 having a radially outwardly extending flange 130 at its lower end is secured to the radially inwardly extending flange 122 at the top of the base and to the inner wall of the cylinder 114 to provide an annular cooling fluid passageway to protect and prevent burning of the seal 124. Suitable connections, such as the pipes 132, 134 are connected to the flange 130 forming the bottom of the annular water passageway to provide a means for connecting the passageway to a source of cooling fluid and to drain externally of the furnace, respectively. Means for evacuating the base, as well as the remainder of the furnace, which is in open communication therewith, such as the interior of the inner cylinder of the electrode housing, is provided by tubular member 135 extending through the cylinder 114 and having a flange 136 at its outer end adapted to be connected to a conduit 138 leading to a suitable vacuum pumping system, not shown. A blowout port 140 may also be provided in the outer wall of the base portion if desired.

The base is also provided with a tubular internally fluid-cooled baffle 142 extending coaxially within the base from the lower end thereof and comprising an inner tubular sheet metal member 144 having a radially outwardly extending flange 146 at its upper end from which depends an outer cylindrical sheet metal member 148 disposed concentrically of the inner tubular member 144 to provide an annular passageway therebetween. The lower end of the outer tubular member 148 is welded to an annular metal plate 150 forming a radially outwardly extending flange thereon, the upper surface of which supports an annular insulating block 152 which in turn supports on its upper surface an annular flange 154 on the lower end of the cylinder 114. It should here be noted that the baffle 142 is spaced radially inwardly of the insulating block and thus protects the same against arc radiation and from condensible volatiles during operation of the furnace. Seals 156, 158 are provided between the insulating block 152 and flanges engaged therewith. An annular metal spacer or ring 160 is welded to the underside of the flange 150 on the outer tubular member of the baffle 142 and to the lower end of the inner tubular member 144 of the baffle to close the lower end of the annular passageway in the baffle. The flange 154 on the lower end of the cylinder 114, the insulating block 152, and the flange 150 on the baffle are maintained in assembly by a plurality of bolts, not shown. Means for connecting the internal passageway in the baffle 142 to an external source of cooling fluid and to drain is, in the specific embodiment, provided by pipes 164 leading from the baffle and connected to internal passageways 168 provided in the flange 150 of the baffle.

Figure 8:
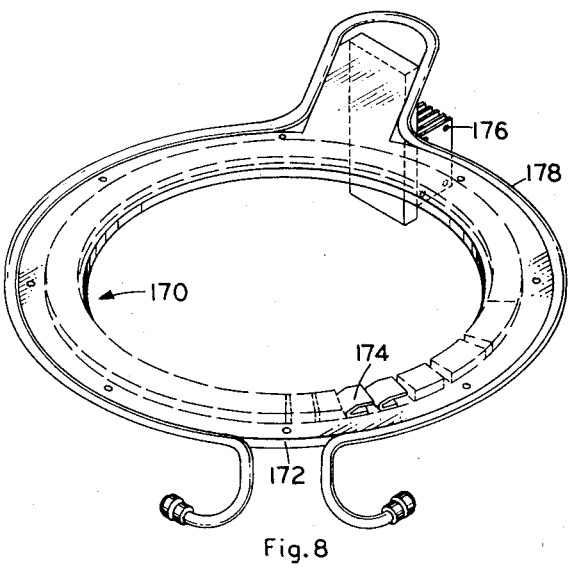
Fig. 8 is a perspective view of the electrical contactor to be disposed between the electrode housing and base portion.
Figure 9:
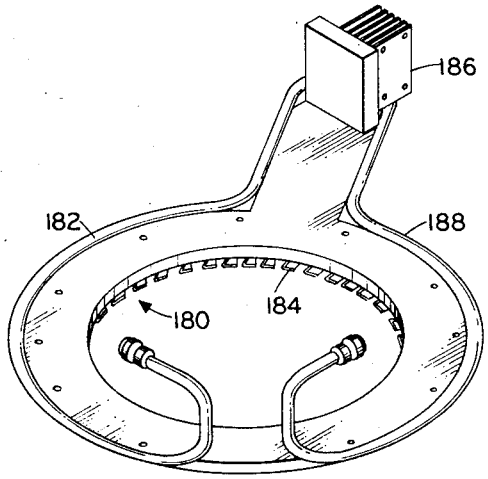
Fig. 9 is a perspective view of the resilient electrical contactor to be disposed between the base portion and crucible.

The base portion 100 also carries a quick disconnect electrical power connector 170 for the inner cylinder 40 of the electrode housing which, as shown in Figs. 5 and 8, in the specific embodiment comprises a bus ring in the form of an annular copper plate 172 fixed concentrically to the radially outwardly extending flange 116 at the upper end of the base and carrying a plurality of circularly arranged resilient contact members 174, in electrical connection with the plate. The contact members are, in the specific embodiment, somewhat C-shaped in cross section to provide the desired resilience and are engageable with the under side of the outwardly extending flange 94 at the lower end of the electrode housing to provide a current connection through the flange to the inner cylinder 40 of the electrode housing. A connector 176 is mounted on the bus ring 172 for connection of the bus ring to a source of power, and tubing 178 is mounted generally about the periphery of the bus ring to provide means for cooling of the power connector 170. A lower power connector 180 which as shown in Fig. 8 is generally similar to the upper power connector 170, just described, although somewhat smaller in size, is fixed to the underside of the outwardly extending flange on the outer tubular member 148 of the annular baffle 142 on the base 100 as shown in Fig. 5. The lower connector comprises an annular plate or bus ring 182 fixed to the flange and carrying a plurality of circularly arranged, generally C-shaped, contacts 184 and a connector 186 for connection to an external source of power, Piping 188 is provided about the periphery of the bus ring for water cooling of the connector 180 during operation of the furnace.

Figure 11:
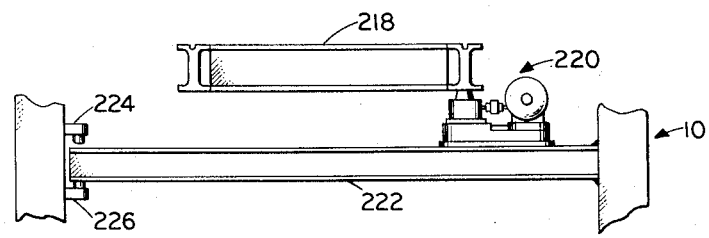
Fig. 11 is a fragmentary end view of the lower portion of the furnace supporting frame of Fig. 1 illustrating the resilient support and drive for the crucible.

The lower power connector is, as is shown in Fig. 5, engageable with a crucible 190 seated on the bottom of the base 100 in coaxial alignment with the furnace body. The crucible 190 comprises an inner mold or liner 192 having a radially outwardly extending flange 194 at its upper end which seats on the bottom of the baffle 142 in the base 100 and is also engageable with the contacts 184 of the lower power connector 180. A seal 193, carried by the baffle, provides a hermetic seal between the crucible and base. The crucible has an outer cylindrical member 196 forming a water jacket therefor, a removable water cooled bottom 198, and a stirring coil 199. The crucible is carried by a supporting member or dolly 200, which as shown in Fig. 10 comprises a base 202 on which the crucible bottom rests and may be secured by clamps 204. The base 202 is suspended from aligned pivot pins 206 carried by opposite sides of a generally rectangular frame or body 208 of the dolly which also carries a pair of aligned rollers 210, the axes of which extend at right angles to the axes of the pivot pins from which the dolly base is suspended. The rollers, and thus the dolly, are supported on a pair of parallel spaced apart guide rails 212, 214 which as shown in Fig. 2 are connected at one end by a cross bar 216 which may be bolted or otherwise secured to the floor 14 adjacent the edge of the pit 12. The rails extend toward the furnace body and as shown in Fig. 11 the ends of the guide rails adjacent the furnace are connected by a cross bar 218 supported intermediate its length by a motorized jackscrew 220 carried by a cantilever beam 222 mounted at one end of the furnace supporting frame 10. The cantilever mounting of the guide rails in effect provides a pair of hingedly mounted rails which may be raised and lowered relative to the furnace body by the jackscrew. The cantilever beam 22 on which the jackscrew is mounted, preferably extends beyond the jackscrew where it is engageable with the pair of limit switches 224, 226 mounted on the furnace frame and connected by suitable means, not shown, to the motor driving the jackscrew to limit the raising and lowering of the guide rails and crucible. The cantilever mounting of the guide rails and of the jackscrew provides the desired resilient support of the crucible in seating engagement on the furnace body and also prevents jamming of the jackscrew when the crucible seats. To provide for movement of the dolly along the rails, a reversible motor 227 is mounted on one end of the rails and drives an endless chain 229 connected to the dolly. It should be noted in Fig. 5 that no bolts or other fastening means are used to secure the crucible to the furnace body, the seating and unseating of the crucible, as well as the making and breaking of the electrical connection thereto being accomplished solely by the raising and lowering of the guide rails.

In loading an electrode into the electrode housing, the housing is first raised by the hydraulic cylinder 36 out of seating engagement with the base 100, thereby breaking the electrical connection between the cylinder 40 of the electrode housing and the upper power connection 170 on the base. The electrode housing may then be swung laterally in a counterclockwise direction, as viewed in Fig. 2, for registry with an electrode carrier 230 mounted on the platform 15 and from which an electrode may be suspended in vertical position through a slot in the platform 15. As shown most clearly in Fig. 12, the electrode carrier 230 comprises a vertically extending channel-shaped member 232 mounted on a flat base 233 and having a supporting plate 234 secured at its upper end. The supporting plate is provided with an aperture, open at one side, with the upper bordering edge portion of the aperture being relieved as at 236 to form a seat for the bottom of an electrode adapter, such as shown in Fig. 7, whereby an electrode will be suspended in a vertical position by the carrier. The carrier is provided at its lower end with a pair of aligned rollers, such as 238, on opposite sides thereof which are engaged with a pair of outer guide rails 240, 242 on the base 233 with stop blocks 244 being provided at the ends of the outer guide rails to limit movement of the carrier in both directions. The channel member 232 is further provided at its lower end with a pair of parallel spaced apart guide plates 246, 248 engageable with a third inner guide rail 250, extending parallel and between the outer guide rails, to maintain the carrier in alignment with the outer guide rails. A third roller 252 is carried between the guide plates 246, 248 and engageable with the inner guide rail to provide a three-point suspension of the channel member 232. To provide means for locating the carrier in the desired position on the platform, a pair of parallel, spaced apart locking rods 254, 256, on opposite sides respectively of the inner guide rail, are slidably carried by lugs on the channel member for movement longitudinally thereof with the lower ends of the rods being engageable in a plurality of aligned apertures 258 in the platform.

With an electrode suspended from the carrier 230 and the electrode housing aligned therewith, the electrode support assembly may be lowered for engagement of the clamping portion thereof with the electrode adapter and the electrode then raised into the housing. The housing is then swung into alignment with the base 100 and lowered in seating engagement therewith and into engagement with the upper power connector on the base to complete the power connection to the electrode within the housing. The crucible is then moved into alignment with the base and raised into seating engagement therewith and into engagement with the lower power connection on the base to complete the power connection to the inner mold liner. The electrode may then be lowered and an arc struck between the electrode and a quantity of scrap material on the bottom of the mold. The electrode is moved during furnace operation, as required by the consumption thereof, with the movement of the electrode being preferably controlled by a suitable automatic control responsive to the voltage drop between the electrode and the molten pool of metal formed thereby. Such control systems are well-known and therefore will not be further described.

From the foregoing detailed description of my furnace, it can be seen that I have provided a consumable electrode type vacuum arc furnace which will readily fulfill the overall objective of my invention of simplifying and facilitating the manufacture, installation, and operation of such a furnace. While my invention has been shown and described in terms of the preferred embodiments, it should be apparent from the foregoing that the scope of my invention is not limited to these specific embodiments and includes all modifications thereto falling within the true scope of my invention as defined in the appended claims.

What I claim as new and desire to secure by Letters Patent of the United States is:

1. In an electric arc furnace, an electrode housing comprising a pair of elongated hollow members arranged one within the other in spaced relation to form a passageway for the circulation of cooling fluid therebetween, an electrode support assembly wholly received within the inner member of said pair of members and having electrical contact means in sliding engagement with the inner wall of said inner member, means for connecting said inner member to an external source of electric current, and means on the housing connected to the electrode support assembly for effecting movement of the support assembly longitudinally of the housing.

2. In an electric arc furnace, an electrode housing comprising a pair of elongated cylindrical members arranged one within the other, said pair of members being spaced radially of each other to form a passageway for the circulation of cooling fluid therebetween, means on the housing sealing the ends of said passageway, conduit means on the housing providing an inlet and an outlet for said passageway, an electrode support assembly wholly received within the inner member of said pair of members and having electrical contact means in sliding engagement with the inner wall of said inner member, and means on the housing connected to the electrode support assembly for effecting movement of the support assembly relative to the housing.

3. In an electric arc furnace, a supporting frame, an electrode housing comprising a pair of elongated cylinders arranged one within the other and spaced radially of each other to form a passageway for circulation of cooling fluid therebetween, an electrode support assembly wholly received within the inner cylinder for movement longitudinally thereof and having electrical contact means in sliding engagement with the inner wall of said inner cylinder, drive means on the housing connected to the electrode support assembly for effecting movement of the support assembly relative to the housing, pivotal support means mounting the housing in vertical position on the frame for swinging movement in a horizontal plane, means mounting the housing on the pivotal support means for limited vertical movement, and drive means for moving the housing vertically.

4. In an electric arc furnace, an electrode housing comprising a pair of elongated concentrically arranged cylinders disposed one within the other, the cylinders being spaced radially of each other to form a passageway therebetween for the circulation of cooling fluid, an electrode support assembly wholly received within the cylinder and having electrical contact means in sliding engagement with the inner wall of the inner cylinder, electrode drive means on the housing adjacent one end thereof connected to the electrode support assembly and suspending the same in the inner cylinder including a drive motor mounted externally of the housing, and closure means sealing said one end of the housing.

5. In an electric arc furnace of the consumable electrode type including an elongated electrode housing in which is receivable an electrode supported for movement longitudinally of the housing and in alignment with a crucible disposed below the housing, supporting means for the housing, pivotally mounting the housing in vertical position for swinging movement in a horizontal plane between a first position for alignment with a crucible and a second position angularly remote from said first position and in which second position an electrode may be loaded into the housing, and means for raising and lowering the housing when the housing is in said first position.

6. In an electric arc furnace of the consumable electrode type, a furnace body including a base portion and an elongated electrode housing arranged in vertical seated relation on the base portion and being constructed to receive therein an elongated consumable electrode for movement longitudinally of the housing, the electrode housing being closed at its upper end and being opened at its lower end, an electrode support supported within the electrode housing for movement longitudinally thereof, a furnace supporting frame, the base portion being fixed to the supporting frame, pivotal supporting means mounting the electrode housing on the furnace supporting frame for swinging movement in a horizontal plane between a first position in alignment with said base portion and a second position angularly remote from said base portion and in which second position an electrode may be loaded generally vertically upwardly into the electrode housing through the open lower end thereof, and means for raising the electrode housing relative to the base portion to unseat the housing from the base portion to permit horizontal swinging movement of the housing to said second position to facilitate loading of an elongated electrode upwardly into the housing.

7. In an electric arc furnace of the consumable electrode type a furnace supporting frame, an elongated vertically extending electrode housing in which is receivable an electrode movable longitudinally thereof, supporting means mounting the housing on the furnace frame for swinging movement in a horizontal plane between an operative position and an electrode loading position and for vertical movement relative to the frame, means for vertically moving the housing relative to the frame between a seated and a raised position, and current connecting means for connecting current from externally of said housing to an electrode in the housing, including separable contact means respectively supported by the frame and by the electrode housing, the separable contact means being disengageable in response to raising of the housing relative to the frame and out of its seated position.

8. In an electric arc furnace of the consumable electrode type including a furnace body having a base portion and a separable electrode housing extending upwardly therefrom, a furnace supporting frame, the base portion being fixed to the frame, supporting means mounting the housing on the furnace frame for swinging movement in a horizontal plane between a position in alignment with the base portion and a second position removed from said base portion and for vertical movement into and out of seating engagement with the base portion, means for raising and lowering the housing relative to the base portion, and current connecting means for connecting current from externally of said housing to an electrode in said housing including separable contact means on the base portion and on the housing disengageable in response to raising of said housing out of seating engagement on the base portion.

9. In an electric arc furnace of the consumable electrode type having a furnace body portion including a base portion and an electrode housing separable from the base portion and extending upwardly therefrom, the electrode housing being adapted to be seated in sealed relationship on the base portion, a supporting frame for the furnace, the base portion being fixedly mounted on the frame, supporting means mounting the housing for vertical movement into and out of sealed seating engagement with the base portion, and resiliently compressible current connecting means disposed between the housing and the base portion for connecting an electrode in the housing to a source of current externally thereof, said current connecting means being sufficiently compressible by the weight of the housing to permit full seating of the housing on the base portion and being separable in response to raising of the housing out of seating engagement with the base portion.

10. In an electric arc furnace of the type including a vertically arranged furnace body and a crucible seated on the bottom of the body and opening thereinto, said body including a base portion on which the crucible is seated comprising a hollow member of substantially greater diameter than the crucible, a baffle on the base circumscribing the opening in the crucible and extending inwardly of the base in radially outwardly spaced relation to the opening in the crucible, the baffle being provided with means for the circulation of cooling fluid for the condensation of volatile matter which may rise from the crucible into the furnace body during operation of the furnace.

11. In an electric arc furnace of the type including a vertically arranged furnace body and a crucible seated on the bottom of the body and opening thereinto, said body including a base portion on which the crucible is seated comprising a hollow member of substantially greater diameter than the crucible, a tubular baffle on the base aligned with the opening in the crucible and extending from closely adjacent the crucible inwardly of the base in radially outwardly spaced relation to the opening in the crucible, the baffle having a passageway internally thereof for the circulation of cooling fluid therein.

12. In an electric arc furnace of the type including a vertically arranged furnace body and a crucible seated on the bottom of the body and opening thereinto, said body including a base portion on which the crucible is seated comprising a hollow member of substantially greater diameter than the crucible and opening thereinto, a tubular baffle on the base extending from closely adjacent the crucible inwardly of the base in alignment with the crucible, the baffle being of substantially greater diameter than the crucible and of substantially lesser diameter than said hollow member, means electrically insulating the baffle from said hollow member, the baffle having an internal passageway for the circulation of cooling fluid therein, and conduit means mounted on the base connected to the baffle for the circulation of cooling fluid therethrough.

13. In an electric arc furnace of the type having a vertically arranged furnace body including a base and an electrode housing extending upwardly therefrom and a crucible seated in the bottom of said base and opening into the base, said base comprising a hollow member of substantially greater diameter than the crucible having a baffle circumscribing the opening in the crucible and extending from closely adjacent the crucible inwardly of the base in radially outwardly spaced relation to the opening in the crucible, means on the baffle for the circulation of cooling fluid therearound, the electrode housing including an elongated hollow member aligned with the crucible and so constructed that it can receive an electrode support assembly in sliding electrical contact, and means forming a fluid-cooled baffle surrounding said elongated hollow member and extending inwardly of the base in alignment with the first-mentioned baffle.

14. In an electric arc furnace of the type having a furnace supporting frame, a vertically arranged electrode housing supported on the frame for vertical movement, and a crucible disposed in alignment with the electrode housing, a furnace body base portion fixed to the frame between the electrode housing and crucible, and comprising a vertically arranged cylindrical metal member having means at its upper end for seating the electrode housing in sealed relation, elongated tubular baffle means extending coaxially within the lower end of the cylindrical member and forming a seat for the crucible, the baffle means being provided with an internal cooling fluid passageway for the circulation of cooling fluid therein, and means rigidly mounting the baffle means on the cylindrical member including means electrically insulating the baffle means and cylindrical member.

15. In an electric arc furnace of the consumable electrode type, a furnace supporting frame, a furnace body including a base fixed on the frame and an electrode housing seated on the base and supported on the frame for vertical movement relative to the base, a crucible seated on the base opposite the electrode housing and supported for vertical movement relative to the base, means for connecting a source of electrical current to the electrode housing and crucible respectively comprising quick disconnect resilient electrical contact means carried by the base at opposite ends thereof and engageable respectively with the electrode housing and crucible in response to seating thereof on the base, and insulating means electrically insulating the contact means associated with the electrode housing from the contact means associated with the crucible.

16. In an electric arc furnace having an electrode housing including an elongated hollow member, an electrode support assembly comprising a generally cylindrical electrode holder to engage one end of an elongated electrode, means for suspending the holder in vertical position within said hollow member and for movement longitudinally of said hollow member, a plurality of annularly arranged resilient elongated electrical contact members mounted on the holder in electrical connection therewith and extending upwardly and outwardly of the holder in cantilever fashion and into wiping engagement with the interior of said hollow member.

17. In combination with an electric arc furnace including an elongated vertically arranged electrode receiving furnace body and a crucible constructed to be seated in aligned position on the bottom of the furnace body; means supporting the crucible in vertical position for universal tilting movement and for movement generally laterally of the furnace, and means mounting the crucible supporting means for vertical movement relative to the furnace body.

18. In combination with an electric arc furnace having a vertically arranged furnace body and a crucible constructed to be seated on the bottom of the furnace body; crucible supporting means supporting the crucible in an upright position for movement in a direction generally laterally of the furnace, means hingedly mounting the crucible supporting means to provide limited vertical movement thereof, and resilient drive means engageable with the crucible supporting means for supporting the same in vertically adjusted position.

19. In combination with an electric arc furnace of the type including a vertically arranged furnace body and a crucible constructed to be seated in seated relation to the furnace body; crucible handling and supporting means comprising a pair of elongated spaced apart guide rails, means for hingedly mounting the guide rails at one end thereof, a crucible supporting carriage supported by the guide rails for movement longitudinally thereof, drive means engaging the guide rails to position and support the same in vertically adjusted position, and a resilient support mounting said drive means.

20. In combination with an electric arc furnace of the type including a vertically arranged furnace body and a crucible constructed to be seated in seated relation to the furnace body; crucible handling and supporting means comprising a crucible dolly having a pair of axially aligned rollers, dolly supporting means extending generally laterally of the furnace body and supporting said rollers for movement of the dolly toward and away from the furnace body, the dolly having a crucible supportable base mounted for pivotal movement about an axis extending at right angles to the rollers, and means to raise and lower the dolly supporting means.

21. In an electric furnace of the type including a frame, a furnace body supported on the frame, and a crucible constructed to be engaged in depending fashion on the furnace body; crucible handling and supporting means comprising a pair of elongated parallel spaced apart rails extending from adjacent the furnace body and outwardly thereof, means mounting the outer end of the rails to provide for limited vertical movement of the other ends thereof disposed adjacent the furnace body, a dolly having a pair of axially aligned rollers supporting the dolly on the rails for movement therealong, the dolly having a crucible supporting base pivotally mounted for movement about an axis extending at right angles to the rollers, a cantilever beam supported at one end on said frame whereby the other end of the beam may be deflected by a load, and drive means carried by the cantilever beam and supporting said other ends of the rails in vertically adjusted position relative to the furnace body.

22. In an electric arc furnace having an electrode housing including an elongated hollow metal member, the combination of means for connecting said hollow member to a source of electrical current, an electrode holder disposed within said hollow member for movement longitudinally thereof and constructed to support an electrode in depending relation within said hollow member, a plurality of resilient electrical contact members mechanically and electrically connected to the electrode holder for movement therewith and resiliently engaging the inner wall of said hollow member in wiping contact, and means for moving said electrode holder and contact members as a unit longitudinally of said hollow member.

23. In an electric arc furnace of the type having an elongated hollow metal member for receiving an electrode, an electrode support and current collector assembly supported within said hollow member for movement longitudinally thereof and having means for supporting an electrode in depending relation within the hollow member, said assembly further including a plurality of flexible resilient electrical contact members electrically connected to the electrode supporting means and wipingly engaging the inner wall of said hollow member, and means for connecting said inner wall of the hollow member to a source of electric current.

24. In an electric arc furnace constructed for use with a consumable electrode, an elongated electrode housing, electrode supporting means disposed within the housing for movement longitudinally thereof, an electric current collector disposed within the housing in mechanical and electrical connection with the electrode support, means for moving the electrode support and current collector longitudinally of the housing for feeding an electrode carried by the electrode support relative to the housing, the current collector including electrical contact means, and electrical contact means on the housing extending longitudinally thereof over at least the range of travel of the current collector and in wiping contact therewith, and means for connecting the contact means on the housing to a source of electric current.

25. In an electric arc furnace, an electrode housing, an electrode support supported in said housing for movement relative thereto, and a separable base portion on which the housing may be seated in sealed relation, a current connector comprising an annular bus ring of electrically conductive metal constructed for mounting on the base portion, a plurality of circularly arranged generally C-shaped, resilient electrical contacts arranged concentrically on the bus ring in electrical connection therewith, means on the housing electrically connected to the electrode support and engageable in electrical connection with said contacts when the housing is seated on the base portion, means on the bus ring for connecting the bus ring to a source of current, and conduit means carried by the bus ring adjacent the periphery thereof constructed to be connected to a source of fluid coolant.

References Cited in the file of this patent

UNITED STATES PATENTS

| | | |
|---|---|---|
| 2,193,434 | Sem | Mar. 12, 1940 |
| 2,226,747 | Sem | Dec. 31, 1940 |
| 2,290,029 | Brooke | July 14, 1942 |
| 2,396,663 | Kuelthau et al. | Mar. 19, 1946 |
| 2,592,517 | Ingelsrud | Apr. 8, 1952 |
| 2,651,668 | Southern | Sept. 8, 1953 |
| 2,662,104 | Southern | Dec. 8, 1953 |
| 2,671,816 | Foyn | Mar. 9, 1954 |
| 2,677,710 | Southern et al. | May 4, 1954 |
| 2,686,826 | Paine | Aug. 17, 1954 |
| 2,726,278 | Southern | Dec. 6, 1955 |
| 2,727,936 | Boyer | Dec. 20, 1955 |
| 2,727,937 | Boyer | Dec. 20, 1955 |
| 2,762,856 | Newcomb et al. | Sept. 11, 1956 |
| 2,771,498 | Bredschneider et al. | Nov. 20, 1956 |
| 2,848,524 | McLaughlin et al. | Aug. 19, 1958 |